United States Patent [19]

Sukegawa et al.

[11] Patent Number: 5,546,205
[45] Date of Patent: Aug. 13, 1996

[54] ACTIVE MATRIX LIQUID CRYSTAL DISPLAY PANEL HAVING COMPENSATING CAPACITOR PROVIDED WITHOUT LOWERING PIXEL APERTURE RATIO

[75] Inventors: Osamu Sukegawa; Hirofumi Ihara, both of Tokyo, Japan

[73] Assignee: NEC Corporation, Tokyo, Japan

[21] Appl. No.: 249,624

[22] Filed: May 25, 1994

[30] Foreign Application Priority Data

May 25, 1993 [JP] Japan ................................ 5-122238

[51] Int. Cl.⁶ ........................................... G02F 1/133
[52] U.S. Cl. ...................................... 359/59; 359/57
[58] Field of Search .............................. 359/59, 57

[56] References Cited

U.S. PATENT DOCUMENTS

| | | | |
|---|---|---|---|
| 5,132,819 | 7/1992 | Noriyama et al. | 359/59 |
| 5,285,302 | 2/1994 | Wu | 359/59 |
| 5,302,987 | 4/1994 | Kanemori et al. | 359/59 |
| 5,321,535 | 6/1994 | Ukai et al. | 359/59 |
| 5,432,625 | 7/1995 | Morin et al. | 359/59 |

FOREIGN PATENT DOCUMENTS

| | | |
|---|---|---|
| 2-79476 | 3/1990 | Japan . |
| 2-234128 | 9/1990 | Japan ............................ 359/59 |
| 4-68319 | 3/1992 | Japan . |

Primary Examiner—William L. Sikes
Assistant Examiner—Charles Miller
Attorney, Agent, or Firm—Young & Thompson

[57] ABSTRACT

In an active matrix liquid crystal display panel, each pixel electrode is connected to a first drain bus line through a thin film transistor which is formed adjacent to an intersection between the first drain bus line and an orthogonal gate bus line. A compensating capacitor lower electrode extends from the gate bus line at a position near to a second drain bus line which is adjacent to the pixel electrode in such a manner that the pixel electrode is positioned between the first and second drain bus lines. A compensating capacitor upper electrode is formed integrally with a source electrode of the thin film transistor, to extend along the pixel electrode so as to overlap above the compensating capacitor lower electrode through an insulator layer. Thus, a compensating capacitor is formed of the compensating capacitor lower and upper electrodes and is connected to a gate-source capacitance of the thin film transistor. A change in the gate-source capacitance caused by the positional deviation in the alignment between a gate electrode and the source electrode of the thin film transistor can be compensated by the inverse change in the capacitance of the associated compensating capacitor, without decreasing the aperture ratio of the pixel.

8 Claims, 3 Drawing Sheets

5,546,205

ACTIVE MATRIX LIQUID CRYSTAL DISPLAY PANEL HAVING COMPENSATING CAPACITOR PROVIDED WITHOUT LOWERING PIXEL APERTURE RATIO

BACKGROUND OF THE INVENTION

1. Field Of The Invention

The present invention relates to a liquid crystal display panel, and more specifically to a compensating capacitor provided for each pixel in an active matrix liquid crystal display panel.

2. Description Of Related Art

Liquid crystal devices are energetically researched and developed as display apparatuses and light modulation devices. In general, the liquid crystal device is fundamentally formed of a pair of electrode plates opposing to each other, and a liquid crystal material sandwiched between the pair of electrode plates. In a liquid crystal device including a plurality of pixels, the electrodes formed on one of the pair of electrode plates are, in many cases, different in size from those formed on the other electrode plate. Particularly, in an active matrix liquid crystal display panel including switching devices such as a thin film transistor (TFT), the switching devices and pixel electrodes connected thereto are formed on one of the pair of electrode plates (main plate), and a common opposing electrode is formed on the whole of the other electrode plate (opposing plate).

The active matrix liquid crystal display panel including switching thin film transistors is widely used at present, since it is very advantageous in that it can be realized in a very thin structure and can be driven with a lower consumed electric power. However, the active matrix liquid crystal display panel has a problem in which variation or deviation in alignment between a gate electrode and a source electrode in the thin film transistor results in variation of an inevitable parasitic capacitance formed between the gate electrode and the source electrode, with the result that the voltage on a pixel electrode connected to the source electrode changes from one pixel to another, so that unevenness occurs in contrast, and therefore, picture quality deteriorates.

In order to overcome this problem, Japanese Patent Application Laid-open Publication JP-A-02-079476 has proposed one method, in which, as shown in FIG. 1, a gate electrode 3 is deposited on a glass substrate 1, and a semiconductor thin film 6 is formed through an insulting film 5 on the gate electrode 3, and further, a drain electrode 8 is formed on a center region of the semiconductor thin film 6, and a pair of source electrodes 9 are formed on opposite end regions of the semiconductor thin film 6, so that a pair of thin film transistors are constructed in symmetry to each other. The pair of thin film transistors are connected to each other in parallel.

With this arrangement, if variation or deviation in alignment in a manufacturing process results in increase of a gate-source capacitance in one of the pair of thin film transistors, the gate-source capacitance decreases in the other of the pair of thin film transistors. Accordingly, variation or fluctuation of the total gate-source capacitance in the pair of parallel connected thin film transistors is prevented or compensated.

Japanese Patent Application Laid-open Publication JP-A-04-068319 has proposed another method as diagrammatically shown in FIG. 2, in which elements corresponding in function to those shown in FIG. 1 are given the same reference numerals. As shown in FIG. 2, in proximity of an intersection between a gate bus line 2 and a drain bus line 7, a gate electrode 3 extends from the gate bus line 2, and a semiconductor thin film 6 is formed through a not-shown insulating film on the gate electrode 3. A drain electrode 8 branches out of the drain bus line 7 so as to extend over one end portion of the semiconductor thin film 6, and a source electrode 9 is formed at the opposite end portion of the semiconductor thin film 6, and is connected to a pixel electrode 11. Thus, a thin film transistor is formed. Furthermore, a compensation capacitor electrode 10 extends from the source electrode 9 so as to take a long way around an extension of the gate electrode 3 and to partially overlie the extension of the gate electrode 3 at the side opposite to the source electrode 9. With this arrangement, variation of the gate-source capacitance, which might be caused by variation or deviation in alignment between the gate electrode 3 and the source electrode 9 in a manufacturing process, can be prevented or compensated.

In the above mentioned conventional methods, however, by additional or compensating electrodes provided for the intention of uniformizing the gate-source capacitance of all the thin film transistors, the overall size of the liquid crystal display panel is inevitably increased or the aperture ratio of each pixel is inevitably lowered. For example, in the case of a liquid crystal display panel having a pixel pitch on the order of 300 μm, the pixel aperture ratio is lowered 10% to 20% by the conventional methods for uniformizing the inevitable gate-source capacitance of the thin film transistors.

SUMMARY OF THE INVENTION

Accordingly, it is an object of the present invention to provide an active matrix liquid crystal display panel which has overcome the above mentioned defect of the conventional one.

Another object of the present invention is to provide an improved capacitor structure for compensating variation of the gate-source capacitance of the thin film transistors in an active matrix liquid crystal display panel, without lowering the pixel aperture ratio.

The above and other objects of the present invention are achieved in accordance with the present invention by an active matrix liquid crystal display panel at least including:

an insulating substrate;

a gate bus line formed on the insulating substrate;

a gate electrode formed on the insulating substrate to extend from one side of the gate bus line;

an insulating film covering the gate bus line and the gate electrode;

a semiconductor thin film formed on the insulating film above the gate electrode;

first and second drain bus lines formed apart from each other on the insulating film, to extend so as to intersect the gate bus line and so as to form a pixel region between the first and second drain bus lines;

a drain electrode formed on the insulating film to extend from the first drain bus line so as to overlie one end portion of the semiconductor thin film;

a source electrode formed on the insulating film to extend so as to overlie the other end portion of the semiconductor thin film, so that one thin film transistor is formed of the gate electrode, the semiconductor thin film, the drain electrode and the source electrode;

a pixel electrode formed on the insulating film, in a region defined by the gate bus line and the first and second drain bus lines, the pixel electrode being electrically connected to the source electrode;

a compensating capacitor lower electrode formed between the insulating substrate and the insulating film, to extend from the one side of the gate bus line, along but apart from the second drain bus line; and a compensating capacitor upper electrode formed on the insulating film to extend from the source electrode along a side of the pixel electrode in a direction of the gate bus line, so as to overlie the compensating capacitor lower electrode in proximity of the second drain bus line;

so that one compensating capacitor is formed of the compensating capacitor lower electrode, the insulating film and the compensating capacitor upper electrode, whereby a change in a gate-source capacitance of the one thin film transistor caused by a positional deviation in alignment between the gate electrode and the source electrode can be compensated by an inverse change in a capacitance of the compensating capacitor, without decreasing the aperture ratio of a pixel.

In a preferred embodiment, the gate bus line, the gate electrode and the compensating capacitor lower electrode are formed by a single patterned metal layer deposited on the insulating substrate, and the first and second drain bus lines, the drain electrode and the compensating capacitor upper electrode are formed by another single patterned metal layer deposited on the insulating film.

Preferably, an overlapped width between the compensating capacitor upper electrode and the compensating capacitor lower electrode is substantially equal to a half of a width of a channel formed in the thin film transistor.

The above and other objects, features and advantages of the present invention will be apparent from the following description of preferred embodiments of the invention with reference to the accompanying drawings.

DESCRIPTION OF THE PREFERRED EMBODIMENTS

Figure 1:
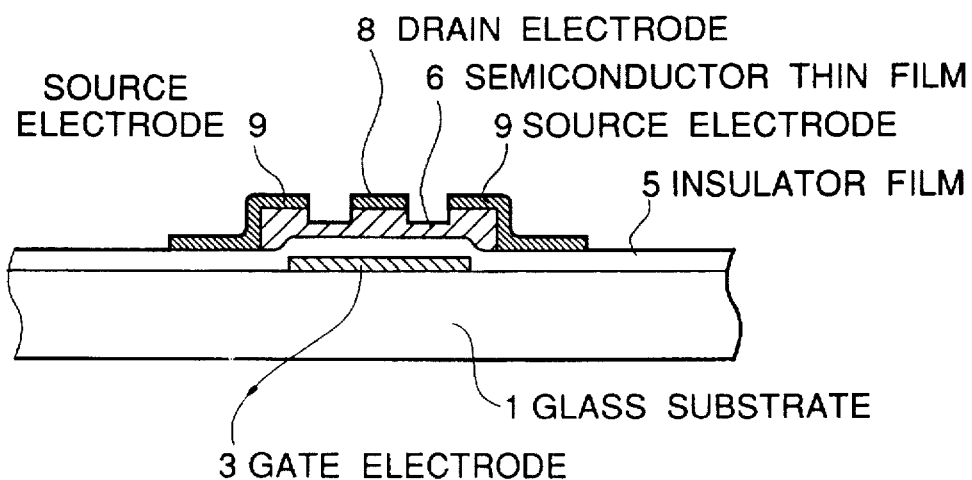
FIG. 1 is a partial diagrammatic sectional view of one example of the conventional active matrix liquid crystal display panel configured to uniformize the inevitable gate-source capacitance of the thin film transistors.
Figure 2:
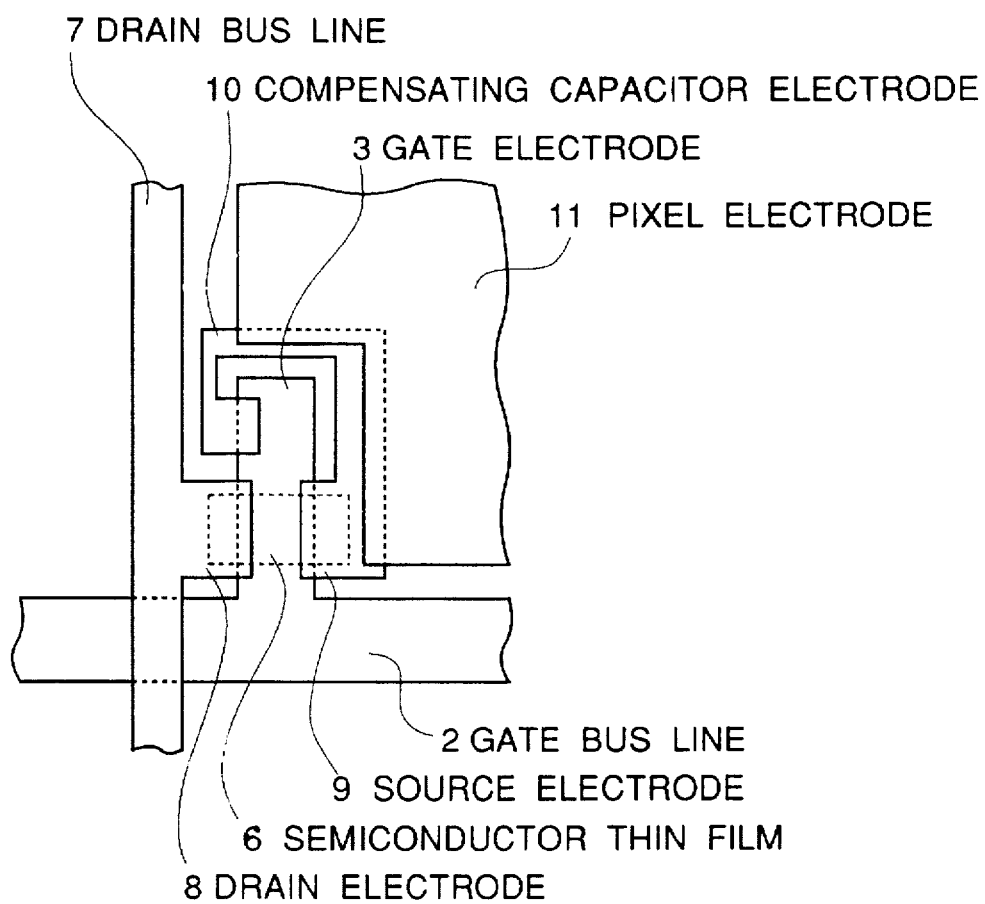
FIG. 2 is a partial diagrammatic layout pattern of another example of the conventional active matrix liquid crystal display panel configured to uniformize the inevitable gate-source capacitance of the thin film transistors.
Figure 3A:
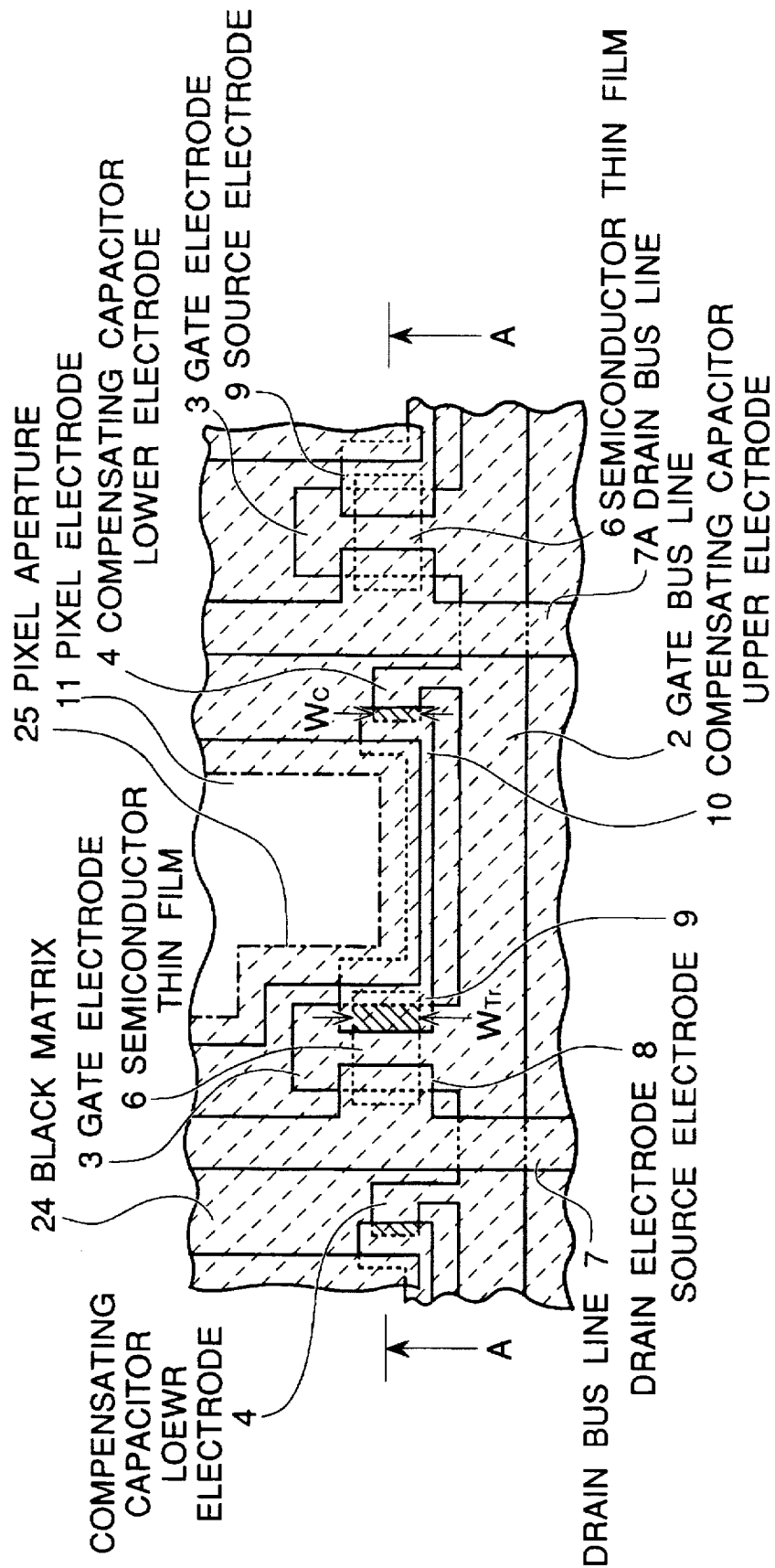
FIG. 3A is a partial diagrammatic layout pattern of one embodiment of the active matrix liquid crystal display panel in accordance with the present invention, having compensating capacitors for uniformizing the inevitable gate-source capacitance of the thin film transistors.
Figure 3B:
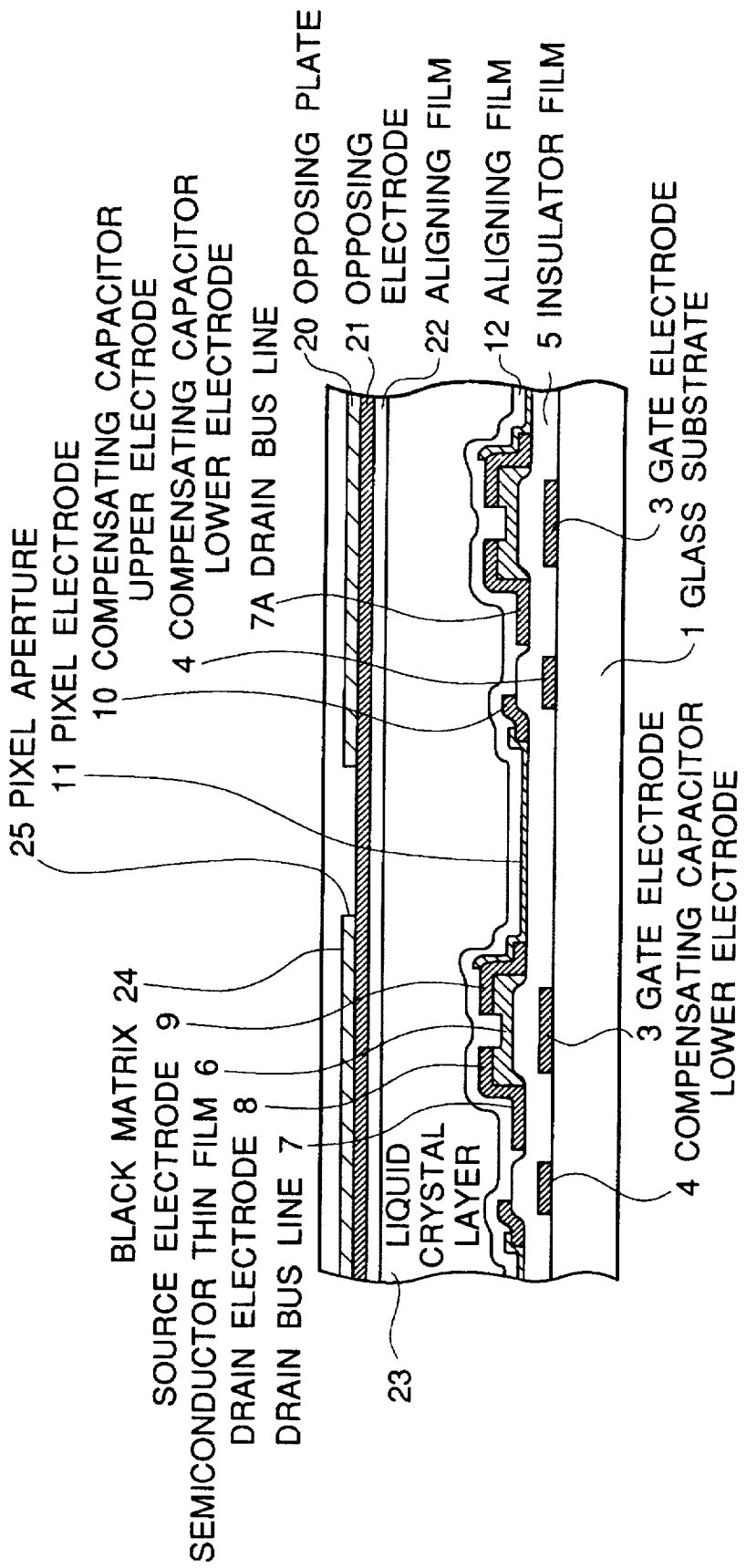
FIG. 3B is a partial diagrammatic sectional view taken along the line A—A in FIG. 3A.

Referring to FIG. 3A, there is shown a partial diagrammatic layout pattern of one embodiment of the active matrix liquid crystal display panel in accordance with the present invention, having compensating capacitors for uniformizing the inevitable gate-source capacitance of the thin film transistors. A partial diagrammatic sectional view taken along the line A—A in FIG. 3A is shown in FIG. 3B. In these Figures, elements corresponding in function to those shown in FIGS. 1 and 2 are given the same reference numerals.

On an inside or upper surface of a main plate formed of a transparent glass substrate 1 as shown in FIG. 3B, a plurality of a gate bus lines 2 are formed to extend in a horizontal direction, in parallel to each other but apart from each other. But of simplification of the drawing, only one gate bus line 2 is shown in FIG. 3A. A plurality of gate electrodes 3 are formed to extend vertically from an upper side of each gate bus line 2 at predetermined intervals. Only two gate electrodes 3 are shown also for simplification of the drawing. Each of the gate electrodes 3 is formed to be located at a lower left corner of a corresponding pixel. In addition, a plurality of compensating capacitor lower electrodes 4 are also formed to extend vertically from the upper side of each gate bus line 2 at predetermined intervals, one per pixel, but positioned at a lower right corner of the corresponding pixel. Similarly, only two compensating capacitor lower electrodes 4 are shown also for simplification of the drawing.

In addition, an insulator film 5 is formed to cover these electrodes 3 and 4 and the bus lines 2 and the exposed upper surface of the glass substrate 1. This insulator film 5 functions as a gate insulator film in each thin film transistor, and also as a dielectric of a compensating capacitor. A semiconductor thin film 6 is selectively formed on the insulator film 5 above each gate electrode 3.

On the insulator film 5, a plurality of drain bus lines 7 and 7A are formed each to vertically extend nearly to a corresponding gate electrode 3 so as to intersect the horizontal gate bus lines 2, so that one pixel is formed at each intersection between the gate bus lines 2 and the drain bus lines 7. Only two drain bus lines 7 and 7A are shown also for simplification of the drawing. From each of the vertical drain bus lines 7, one drain electrode 8 is formed on the insulator film 5 and horizontally extending so as to overlie one side (left side) portion of a corresponding semiconductor thin film 6.

A source electrode 9 is formed on the insulator film 5 to overlie the other (right side) portion of each semiconductor thin film 6. This source electrode 9 extends over the insulator film 5 along the gate bus line 2 but separately from the gate bus line 2 toward the compensating capacitor lower electrode 4, so as to form a compensating capacitor upper electrode 10 which is located over the compensating capacitor lower electrode 4 with the insulator film 5 being sandwiched between the compensating capacitor lower electrode 4 and the compensating capacitor upper electrode 10.

A transparent pixel electrode 11 is formed on the insulator film 5 between each pair of adjacent drain bus lines 7 and 7A and between each pair of adjacent gate bus lines 2 (only one gate bus line 2 is shown in FIG. 3A). This transparent pixel electrode 11 is formed to partially overlie the source electrode 9 and the compensating capacitor upper electrode 10 so as to be electrically connected to the source electrode 9 and the compensating capacitor upper electrode 10.

Thus, one thin film transistor formed of the gate electrode 3, the insulator film 5, the drain electrode 8 and the source electrode 9, is located adjacent to each intersection between one gate bus line 2 and one drain bus line 7, and in proximity of the lower left corner of the pixel electrode 11 so that the thin film transistor is connected at its source electrode 9 to the lower left corner of the pixel electrode 11. On the other hand, a compensating capacitor formed of the compensating capacitor lower electrode 4, the insulator film 5 and the compensating capacitor upper electrode 10, is located at a position which is opposite, along the associated gate bus line 2, to the corner of the pixel electrode 11 connected to the associated thin film transistor, and which is adjacent to a drain bus line 7A for an adjacent pixel in a direction of the same gate bus line 2.

On another transparent glass plate 20 forming an opposing plate, a black matrix 24 defining a pixel aperture 25 in alignment with the pixel electrode 11 is formed, and also, a common opposing electrode 21 formed of ITO is deposited.

An aligning film 12 is coated to cover all of the thin film transistors, the drain bus lines 7, the transparent pixel electrode 11, the compensating capacitor lower electrode 4, and an exposed portion of the insulator film 5. Another aligning film 22 is coated to cover the opposing electrode 21. For example, the aligning films 12 and 22 can be formed of polyimide. The polyimide aligning films 12 and 22 are baked, and a rubbing treatment is performed on the plates thus treated so that when the plates are coupled to each other, the orientation direction of each plate becomes substantially perpendicular to that of the other plate. Thereafter, the plates are coupled to each other in such a manner that a uniform spacing (of for example about 5 μm) is formed between the plates, and for example, a twisted nematic liquid crystal material 23 is injected into the spacing between the plates. Then, the plates were encapsulated. Thus, a liquid crystal display apparatus was obtained.

With the above mentioned arrangement, the gate bus lines 2, the gate electrodes 3 and the compensating capacitor lower electrodes 4 are formed in a single patterned metal layer deposited on the glass substrate 1, and the drain bus lines 7 and 7A, the drain electrodes 8, the source electrodes 9 and the compensating capacitor upper electrodes 10 are formed in another single patterned metal layer deposited on the insulator film 5 and the semiconductor thin film 6. The compensating capacitor formed of the compensating capacitor lower electrode 4 and the compensating capacitor upper electrode 10 is connected in parallel to the gate-source capacitance of a corresponding thin film transistor.

Therefore, if a relative positional relation between the gate electrode 3 and the source electrode 9 is changed due to a positional deviation in a photolithographic process so as to increase a gate-source capacitance, the capacitance of the associated compensating capacitor will decrease. To the contrary, if the relative positional relation between the gate electrode 3 and the source electrode 9 is changed due to a positional deviation in photolithographic process so as to decrease the gate-source capacitance, the capacitance of the associated compensating capacitor will increase.

In the thin film transistor, a MIS (metal-insulator-semiconductor) structure capacitor is formed, and on the other hand, the compensating capacitor has a MIM (metal-insulator-metal) structure. Accordingly, a capacitance per unit area in the thin film transistor is different from that in the compensating capacitor. Typically, by meeting the relation of $W_C \approx 0.5 \times W_{Tr}$ (where $W_{Tr}$ is a channel width of the thin film transistor, and $W_C$ is a width of the compensating capacitor; namely a width, in the vertical direction in FIG. 3A, of an overlapped portion between the compensating capacitor upper electrode 10 and the compensating capacitor lower electrode associated to each pixel electrode 4), the change in the gate-source capacitance caused by the positional deviation in the alignment between the gate electrode and the source electrode in the photolithographic process is cancelled by the inverse change in the capacitance of the associated compensating capacitor, so that a total capacitance of the parasitic gate-source capacitance and the compensating capacitor can be maintained constant.

The lower and upper electrodes 4 and 10 of the compensating capacitor can be formed outside of the pixel aperture 25 which is defined by the black matrix 24 formed to overlie the drain bus lines and the gate bus lines. Accordingly, the compensating capacitor can be formed without decreasing the aperture ratio of the pixels.

As will be apparent from the above description with reference to the drawings, the active matrix liquid crystal display panel in accordance with the present invention is characterized in that the compensating capacitor lower electrode is formed integrally with the gate electrode of the associated thin film transistor formed adjacent to an intersection between each bus line and each drain bus line, but at a position adjacent to an adjacent drain bus line positioned at the side of the associated pixel electrode opposite to the side connected to the associated thin film transistor, and the compensating capacitor upper electrode is formed integrally with the source electrode of the associated thin film transistor so as to overlap the compensating capacitor lower electrode. With this arrangement, the compensating capacitor can be located outside of the pixel aperture. Accordingly, the change in the gate-source capacitance caused by the positional deviation in the alignment between the gate electrode and the source electrode in the photolithographic process can be compensated without decreasing the aperture ratio of the pixels.

The invention has thus been shown and described with reference to the specific embodiments. However, it should be noted that the present invention is in no way limited to the details of the illustrated structures but changes and modifications may be made within the scope of the appended claims.

We claim:

1. An active matrix liquid crystal display panel at least including:

an insulating substrate;

a gate bus line formed on said insulating substrate;

a gate electrode formed on said insulating substrate to extend from one side of said gate bus line;

an insulating film covering said gate bus line and said gate electrode;

a semiconductor thin film formed on said insulating film above said gate electrode;

first and second drain bus lines formed apart from each other on said insulating film, to extend so as to intersect said gate bus line and so as to form a pixel region between said first and second drain bus lines;

a drain electrode formed on said insulating film to extend from said first drain bus line so as to overlie one end portion of said semiconductor thin film;

a source electrode formed on said insulating film to extend so as to overlie the other end portion of said semiconductor thin film, so that one thin film transistor is formed of said gate electrode, said semiconductor thin film, said drain electrode and said source electrode;

a pixel electrode formed on said insulating film, in a region defined by said gate bus line and said first and second drain bus lines, said pixel electrode being electrically connected to said source electrode;

a compensating capacitor lower electrode formed between said insulating substrate and said insulating film, to extend from said one side of said gate bus line, along but apart from said second drain bus line; and a compensating capacitor upper electrode formed on said insulating film to extend from said source electrode along a side of said pixel electrode in a direction of said gate bus line, so as to overlie said compensating capacitor lower electrode in proximity of said second drain bus line;

so that one compensating capacitor consists of said compensating capacitor lower electrode, said insulating film and said compensating capacitor upper electrode, whereby a change in a gate-source capacitance of said one thin film transistor caused by a positional deviation in alignment between said gate electrode and said source electrode can be compensated by an inverse change in a capacitance of said compensating capacitor, without decreasing the aperture ratio of a pixel.

2. An active matrix liquid crystal device claimed in claim 1 wherein said gate bus line, said gate electrode and said compensating capacitor lower electrode are formed by a single patterned metal layer deposited on said insulating substrate, and said first and second drain bus lines, said drain electrode and said compensating capacitor upper electrode are formed by another single patterned metal layer deposited on said insulating film.

3. An active matrix liquid crystal display panel at least including:

an insulating substrate;

a gate bus line formed on said insulating substrate;

a gate electrode formed on said insulating substrate to extend from one side of said gate bus line;

an insulating film covering said gate bus line and said gate electrode;

a semiconductor thin film formed on said insulating film above said gate electrode;

first and second drain bus lines formed apart from each other on said insulating film, to extend so as to intersect said gate bus line and so as to form a pixel region between said first and second drain bus lines;

a drain electrode formed on said insulating film to extend from said first drain bus line so as to overlie one end portion of said semiconductor thin film;

a source electrode formed on said insulating film to extend so as to overlie the other end portion of said semiconductor thin film, so that one thin film transistor is formed of said gate electrode, said semiconductor thin film, said drain electrode and said source electrode;

a pixel electrode formed on said insulating film, in a region defined by said gate bus line and said first and second drain bus lines, said pixel electrode being electrically connected to said source electrode;

a compensating capacitor lower electrode formed between said insulating substrate and said insulating film, to extend from said one side of said gate bus line, along but apart from said second drain bus line; and a compensating capacitor upper electrode formed on said insulating film to extend from said source electrode along a side of said pixel electrode in a direction of said gate bus line, so as to overlie said compensating capacitor lower electrode in proximity of said second drain bus line;

so that one compensating capacitor is formed of said compensating capacitor lower electrode, said insulating film and said compensating capacitor upper electrode, whereby a change in a gate-source capacitance of said one thin film transistor caused by a positional deviation in alignment between said gate electrode and said source electrode can be compensated by an inverse change in a capacitance of said compensating capacitor, without decreasing the aperture ratio of a pixel;

wherein said gate bus line, said gate electrode and said compensating capacitor lower electrode are formed by a single patterned metal layer deposited on said insulating substrate, and said first and second drain bus lines, said drain electrode and said compensating capacitor upper electrode are formed by another single patterned metal layer deposited on said insulating file; and wherein an overlapped width between said compensating capacitor upper electrode and said compensating capacitor lower electrode is substantially equal to a half of the overlapped width of said source electrode and said gate electrode.

4. An active matrix liquid crystal device comprising:

an insulating substrate;

a plurality of gate bus lines formed on an inside surface of said insulating substrate, in parallel to each other and separately from each other, each of said gate bus lines having a plurality of gate electrodes formed integrally therewith at constant intervals to extend perpendicularly from a first side of the gate bus line;

an insulating film formed to coat on said inside surface of said insulating substrate, said gate bus lines and said gate electrodes;

a plurality of semiconductor thin films each formed on said insulating film above a corresponding one gate electrode;

a plurality of drain bus lines formed on said insulating film in parallel to each other and separately from each other, each to extend along but separately from a corresponding gate electrode so as to orthogonally intersect with said gate bus lines so that each one pixel region is defined between a pair of adjacent drain bus lines and a pair of adjacent gate bus lines, each of said drain bus lines having a plurality of drain electrodes formed integrally therewith at constant intervals to extend so as to partially overlap a first side portion of a corresponding semiconductor thin film;

a plurality of source electrodes each formed on said insulator film to partially overlap a second side portion of a corresponding semiconductor thin film opposite to said first side portion, so that a thin film transistor is formed of each semiconductor thin film said gate electrode located under said semiconductor thin film, and said drain electrode and said source electrode located on said semiconductor thin film;

a plurality of pixel electrodes each formed on said insulator film within a corresponding pixel region and electrically connected to a corresponding source electrode;

an opposing plate having an opposing electrode formed on an inside surface of said opposing plate;

a liquid crystal material sandwiched between said inside surface of said insulating substrate and said inside surface of said opposing plate;

a plurality of compensating capacitor lower electrodes each formed integrally with a corresponding gate bus line to extend from said first side of the corresponding gate bus line at a side of the corresponding pixel electrode opposite to the side where said corresponding pixel electrode is connected to the corresponding source electrode;

a plurality of compensating capacitor upper electrodes each formed integrally with and electrically connected to a corresponding source electrode to extend so as to overlap above a corresponding compensating capacitor lower electrode, with only said insulator film being sandwiched between each compensating capacitor upper electrode and said corresponding compensating capacitor lower electrode.

5. An active matrix liquid crystal device claimed in claim 4 wherein each of said source electrodes extends from a location where said source electrode is connected to said corresponding pixel electrode, along a side of said corresponding pixel electrode adjacent to a corresponding gate bus line to which said corresponding pixel electrode is connected through a corresponding thin film transistor, so as to form said compensating capacitor upper electrode above said corresponding compensating capacitor lower electrode.

6. An active matrix liquid crystal device claimed in claim 4 wherein said gate bus lines, said gate electrodes and said compensating capacitor lower electrodes are formed by a single patterned metal layer deposited on said insulating substrate, and said drain bus lines, said drain electrodes and said compensating capacitor upper electrodes are formed by another single patterned metal layer deposited on said insulating film.

7. An active matrix liquid crystal device comprising:

an insulating substrate;

a plurality of gate bus lines formed on an inside surface of said insulating substrate, in parallel to each other and separately from each other, each of said gate bus lines having a plurality of gate electrodes formed integrally therewith at constant intervals to extend perpendicularly from a first side of the gate bus line;

an insulating film formed to coat on said inside surface of said insulating substrate, said gate bus lines and said gate electrodes;

a plurality of semiconductor thin films each formed on said insulating film above a corresponding one gate electrode;

a plurality of drain bus lines formed on said insulating film in parallel to each other and separately from each other, each to extend along but separately from a corresponding gate electrode so as to orthogonally intersect with said gate bus lines so that each one pixel region is defined between a pair of adjacent drain bus lines and a pair of adjacent gate bus lines, each of said drain bus lines having a plurality of drain electrodes formed integrally therewith at constant intervals to extend so as to partially overlap a first side portion of a corresponding semiconductor thin film;

a plurality of source electrodes each formed on said insulator film to partially overlap a second side portion of a corresponding semiconductor thin film opposite to said first side portion, so that a thin film transistor is formed of each semiconductor thin film, said gate electrode located under said semiconductor thin film, and said drain electrode and said source electrode located on said semiconductor thin film;

a plurality of pixel electrodes each formed on said insulator film within a corresponding pixel region and electrically connected to a corresponding source electrode;

an opposing plate having an opposing electrode formed on an inside surface of said opposing plate;

a liquid crystal material sandwiched between said inside surface of said insulating substrate and said inside surface of said opposing plate;

a plurality of compensating capacitor lower electrodes each formed integrally with a corresponding gate bus line to extend from said first side of the corresponding gate bus line at a side of the corresponding pixel electrode opposite to the side where said corresponding pixel electrode is connected to the corresponding source electrode;

a plurality of compensating capacitor upper electrodes each formed integrally with and electrically connected to a corresponding source electrode to extend so as to overlap above a corresponding compensating capacitor lower electrode, with said insulator film being sandwiched between each compensating capacitor upper electrode and said corresponding compensating capacitor lower electrode;

wherein said gate bus lines, said gate electrodes and said compensating capacitor lower electrodes are formed by a single patterned metal layer deposited on said insulating substrate, and said drain bus lines, said drain electrodes and said compensating capacitor upper electrodes are formed by another single patterned metal layer deposited on said insulating film; and wherein an overlapped width between said compensating capacitor upper electrode and said compensating capacitor lower electrode, which constitute together the compensating capacitor connected to one pixel electrode, is substantially equal to a half of the overlapped width of said source electrode and said gate electrode.

8. An active matrix liquid crystal device comprising a plurality of pixels arranged in a matrix form, each of said pixels including a thin film transistor and a pixel electrode, said thin film transistor having a gate electrode, a semiconductor thin film, a gate insulating film intervening between said gate electrode and said semiconductor thin film, a first electrode formed in contact with a first portion of said semiconductor thin film, and a second electrode formed in contact with a second portion of said semiconductor thin film and electrically connected to said pixel electrode, each of said pixels further including a first compensating conductor formed in contact with a part of said pixel electrode and a second compensating conductor electrically connected to said gate electrode and overlapping a part of said first compensating conductor with intervention of only an insulating film to form an MIM-type compensating capacitor.

* * * * *